Sept. 22, 1953  L. ROMANI  2,653,250
TORQUE GOVERNOR FOR ENGINE MAKING USE OF A POWER
SUPPLY THAT IS SUBJECT TO GREAT VARIATION
Filed Dec. 13, 1950  4 Sheets-Sheet 2

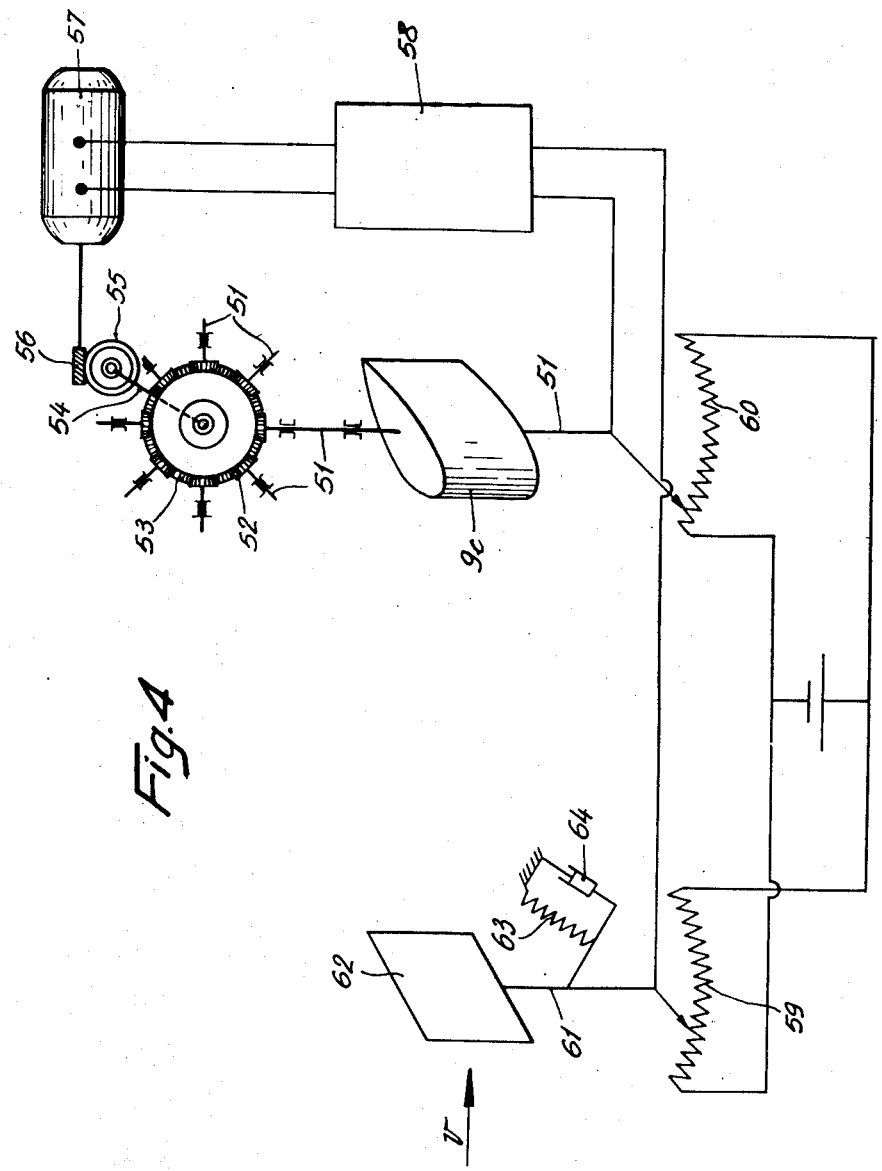

Patented Sept. 22, 1953

2,653,250

UNITED STATES PATENT OFFICE 2,653,250

TORQUE GOVERNOR FOR ENGINE MAKING USE OF A POWER SUPPLY THAT IS SUBJECT TO GREAT VARIATION

Lucien Romani, Paris, France

Application December 13, 1950, Serial No. 200,542
In France December 16, 1949

13 Claims. (Cl. 290—4)

1

My invention relates to devices for keeping at a steady figure the torque exerted on a machine fed by a power supply that undergoes large variation such as a windwheel driving an electric generator, specially a synchronous alternator.

Since it is not possible in practice to use a short-period system of governing of the main wheel, on account of its large size, through a device for varying the pitch of the blades, the methods that have been applied so far have hinged on a coupling system, that may be hydraulic for instance, and that may happen to play the part of brake, and changes the surplus power into heat inside the mechanical setup. These ways of solving the problem come up against serious troubles on account of the huge amount of power wasted when there is a superfluous supply either as a regular thing or that comes in sudden surges.

The principal object of my invention is to provide a torque governor enabling more especially a steady torque to be kept and surplus power to be dispersed, in the shape of useful work or otherwise, or again only partly in the way of useful work, in every case without transforming it into heat within the mechanism.

With this principal object in view, my invention consists according to its broadest aspect in an auxiliary machine acting on the same medium as that forming the power supply, and capable of being actuated with a periodic motion and on this account imparting to the said medium a certain amount of power, as the shaft of this auxiliary machine is connected to the driving shaft and to the shaft of the main machine by means of a transmission system, preferably a differential gear, that enables these three shafts to turn at angular speeds that are variable and differ from each other.

A further object of my invention is to provide a torque governor more particularly adapted to a windwheel driving a synchronous alternator in order to bring about a steady torque on the alternator that revolves at unchanging speed while supplying a steady power that is equal to its rated horsepower provided the force of the wind is enough to give it.

Other objects and features of novelty of my invention will be made apparent by the following description and the annexed drawings which it will be understood are only illustrative of a number of embodiments and that various changes and modifications may be made therein without departing from the spirit and scope of the invention as defined in the appended claims.

2

Figure 1:
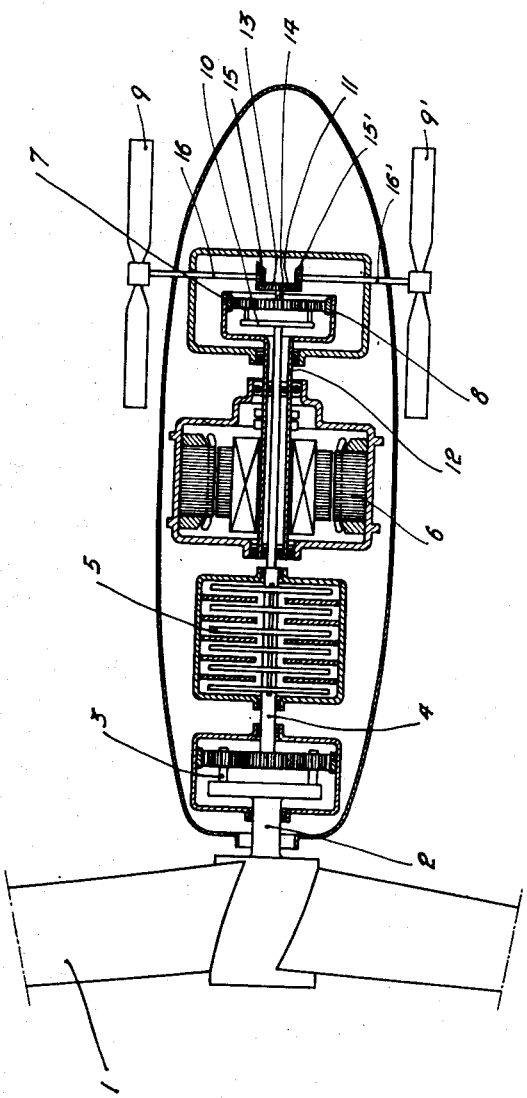
Figure 2:
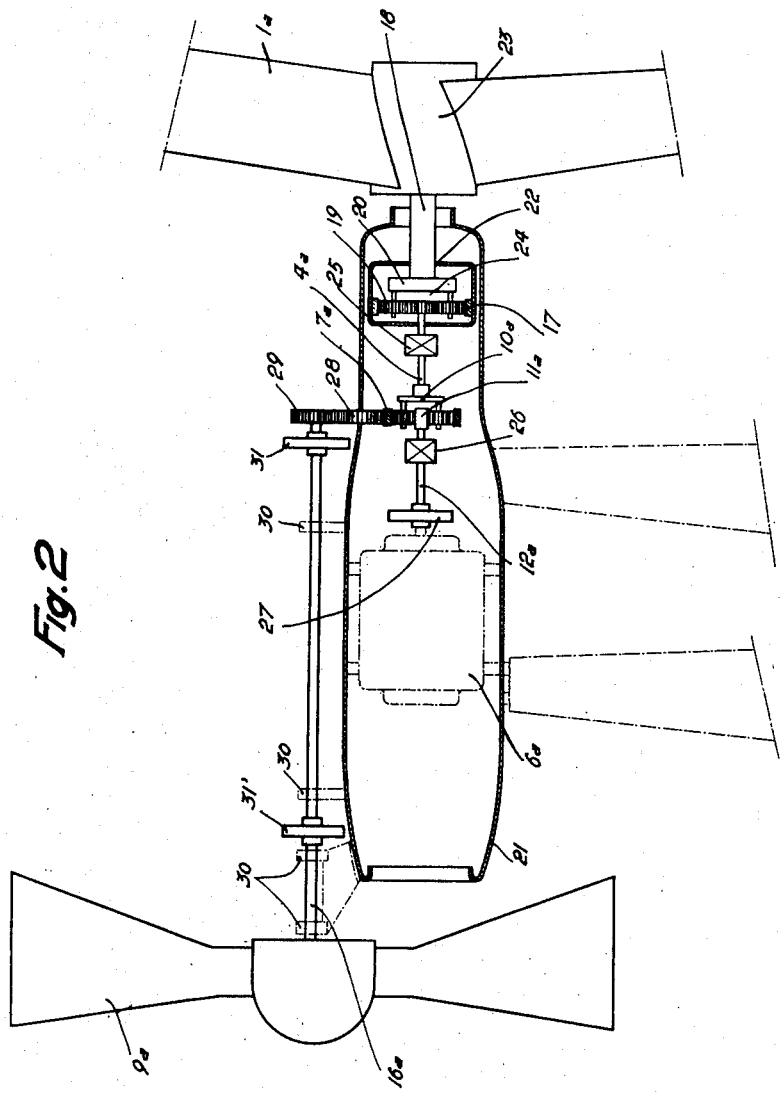
Figure 3:
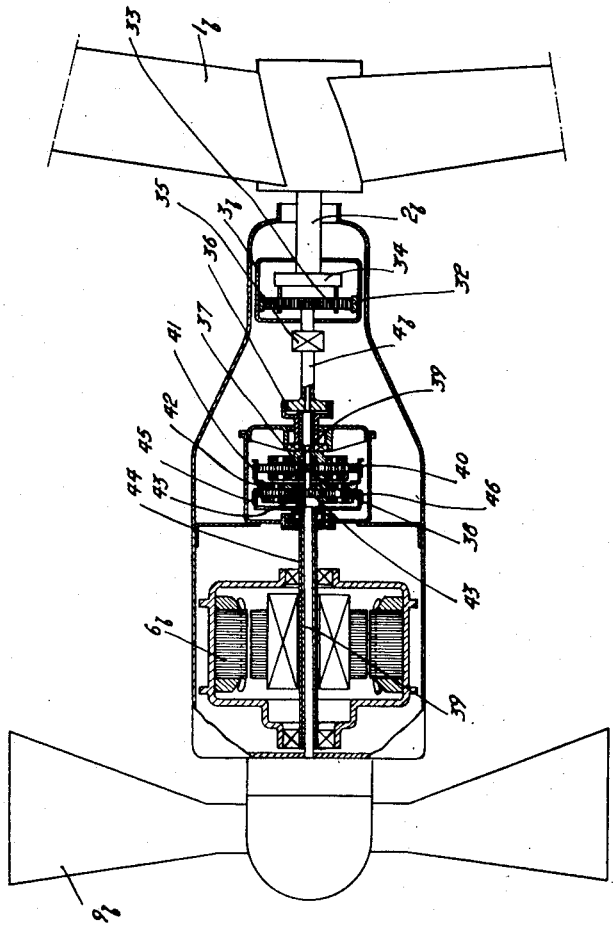

In these drawings:

Fig. 1 shows a part diagrammatic section of the car of a windengine provided with a governor comprising two side vane wheels;

Fig. 2 gives a diagrammatic view of the car of a windengine provided with a vane wheel with axis parallel to the axis of the driving wheel;

Fig. 3 gives a diagrammatic view of the car of a windengine provided with a vane wheel of which the axis is in the extension of the axis of the driving wheel;

Fig. 4 gives a diagrammatic view of an arrangement for controlling the variations of the pitch of any blade of the vane-wheels according to Figs. 1 to 3.

In the example of embodiment shown in Fig. 1, the mechanical setup is provided with a windwheel 1 of large diameter of which the main shaft 2 drives the counter shaft 4 through a stage of epicycloidal gear 3 of which the large crown wheel is fixed and of which the planet-wheels carrier is fixed rigidly with the main shaft. The countershaft 4, fixed rigidly with the sun-wheel of the gear 3 is connected to the disc brake 5, passes through the rotor of the generator 6 and actuates the planet-wheels carrier 10 of a differential 7 of which the outer crown wheel 8 is connected by a shaft 12 to the rotor of the alternator and of which the sun-wheel 11 is fixed rigidly with the vane wheels 9 and 9' by means of a shaft 13, bevel pinions 14, 15 and 15' and sub-shafts 16 and 16' that cause the two vane wheels to revolve in opposite directions to each other.

The characteristic equations of the differential gear enable a determination to be made of the law of variation that the torque must follow on the vane wheel in order to produce the constancy of the torque on the alternator. They show that the torques are in proportion to each other and that all that has to be done is to restrict the torque on the vane wheel in order that the torque on the main shaft is restricted to a value in proportion.

All that has to be done therefore is to compel the vane wheel to preserve a substantially constant torque, above certain predetermined torque, through any suitable standard arrangement, for instance through variation of its pitch, so as to effect a constant torque on the alternator, said pitch being controlled for instance by an electro-aerodynamic relay of a known type, operated by the wind and including, for instance, an anemometer and potentiometers, so that said pitch may vary in dependence with the wind speed.

In the example of embodiment shown in Fig. 4, the blades 9c are rotatably mounted upon longitudinal axes 51 carrying at their end a bevel pinion 52 in mesh with a crown wheel 53 fixed on a shaft 54. On same shaft 54 is fixed another wheel 55 in mesh with a tangent-screw 56 rotatively connected with the driven shaft of an electric motor 57. The motor 57 is controlled by an amplifier 58 connected to two potentiometers 59, 60 to form a Wheatstone bridge. One of the potentiometers 59 is controlled by the rotation of the shaft 61 of an anemometer 62 acted upon by the wind $v$ the shaft 61 being provided with a return-spring 63 and a damping device 64. The other potentiometer 60 is controlled by the rotation of the shaft 51 of the blade 9c.

According to the speed of the wind $v$ the adjustment of the potentiometer 59 is varied and, the Wheatstone bridge 58, 59, 60 being out of balance a potential difference appears between the terminals of the amplifier 58 and the engine 57 is supplied with current, therefore driving in rotation the tangent screw 56 and the wheel 55, and consequently the crown wheel 53, the bevel pinions 52 and the shafts 51. As soon as the Wheatstone bridge is balanced again, the rotation stops.

The pitch of the blades 9c is thus controlled in dependence with the wind speed.

For a wind force of $V_n$, that depends on the characteristics of the mechanism and may be taken as equal, for instance, to 16 metres per second, the vane wheel comes to rest, the power is a maximum; that is the rated horsepower of the alternator, and the velocity of the wheel or synchronizing velocity is the same as if the vane wheel was not there.

When the velocity of the wind goes over $V_n$, the vane wheel turns and enables the driving-wheel to go over the synchronizing speed.

When the normal working conditions are set up for a wind $V_1$, and the wind takes sharply the figure $V_2$, then after a certain time takes instantaneously a lower figure $V_3$, the examination of the behaviour of the system shows that, for symmetrical variations of the wind around the average and of low enough period, in the nature of a few seconds, there is balancing of power and the alternator works always at the power corresponding to the average velocity; in short, in the event of momentary excess of the driving torque, a portion only of the power is dissipated, another portion is placed in reserve in the shape of kinetic energy and may be partly recovered during a later weakening of the driving torque. The excess power, occasionally quite extensive, scattered in the shape of whirling motions of the air by a comparatively very light-weight vane wheel, is not transformed at once into heat and the mechanism does not run hot.

The governor, that forms the object of my invention, presents moreover, in the case investigated, the convenience when the wind force is low of avoiding the always ticklish job of connecting and disconnecting of the alternator, an absolutely necessary operation when the main wheel is directly connected to the generator, if it is desired to avoid the conversion of the alternator from a producer to a consumer of power from the network to which it is connected.

The presence of an additional shafting connected to the vane wheel, with the latter unclamped at very low speeds, enables the alternator to be connected continuously to the system. It is enough in fact to reduce the vane wheel to zero torque, in order that all differential torques are likewise zero.

When the power delivered is nil, the alternator plays the valuable part of synchronous capacitor by supplying reactive power on the network.

In the example of embodiment as shown in Fig. 2, the windwheel 1a drives the countershaft 4a through a set of epicycloidal gear 17 of which the large crown wheel is fixed and of which the planet gears 19 are driven by a planet-wheel holder 20 fixed rigidly with the main shaft 18 fastened to the hub 23 of the wheel 1a. Bearings 22 are provided between the shaft 18 and bearing blocks of gear 17. On the countershaft 4a fixed rigidly with the sun-wheel 24 of the gearing 17, is set a disc-brake 25.

As in the first embodiment disclosed, the countershaft 4a actuates the planet-wheels carrier 10a of a second set of differential gearing of which the sun-wheel 11a is connected by the shaft 12a to the main driven part 6a through a brake clutch 26 and a joint 27. The large crown wheel 7a of the second differential is double toothed and works together with an intermediate pinion 28 that engages with the driving pinion 29 of the vane wheel 9a. The shaft 16a of the vane wheel 9a is carried by bearings 30 fastened on the car 21 and is connected to the pinion 29 through joints 31 and 31'.

From the instant when the wind velocity goes over the figure $V_n$ corresponding to the rated hp. of the driven alternator, the vane wheel furnished with a suitable standard device, for instance of the electro-aerodynamic type as above described and illustrated in Fig. 4, for governing of torque with substantially constant value, ensures the self-governing of the windwheel and keeps a constant torque on the alternator.

In the same way, the behaviour of the system, in the event of sharp wind variation around its average figure, is that such as previously disclosed.

On the other hand, the setting, of the governing vane wheel opposite to the wind presents, at low speeds, further advantages.

In fact, as long as the wind has not reached the velocity $V_n$ corresponding to the rated hp. of the alternator, the vane wheel not yet of constant torque plays the part of additional wind engine and supplies a driving torque. What happens is that it is no longer requisite, in this case, to provide for its clamping and, furthermore, that the maximum output for the plant is reached for a lower velocity of the wind than in the case of the side vane wheels; the limits of the best wind speeds are further extended.

As previously, at low speeds, the alternator kept permanently connected on the network plays the valuable part of synchronous capacitor.

When the average wind goes over a maximum figure $V_m$, for instance 25 metres per second, the wind engine as previously must be stopped. Use is made then of the vane wheel opposite to the wind, for braking the wheel 1a. For this purpose, without disconnecting the alternator from the network, and by acting on the brake-clutch 26, the shaft of the alternator 12a is declutched from the sun-wheel 11a and this sun-wheel is braked. With the vane-wheel and the wheel 1a then opposed to each other, it is possible, through a comparatively mild braking action exerted at 25 on the sun-wheel of the gearing 17, to bring the latter to a standstill. This ticklish operation then may be thus carried out without bringing the wind-engine from the lee of the wind, without coupling means and without demanding an over powerful braking force.

In the example of embodiment shown in Fig. 3, the wind-wheel 1b drives, as in the previous examples of embodiment, the countershaft 4b through a set of epicycloidal gearing 3b of which the crown wheel 32 is fixed and of which the planet pinions 33 are driven through planet-pinions carrier 34 fixed rigidly with the main shaft 2b. On the countershaft fixed rigidly with the sun-wheel of the gearing is set a disc-brake 35.

The countershaft 4b is made rigid through a grooved linking 36 with the planet-pinions carrier 37 of a primary differential set, of which the sun-wheel 38 is keyed on the end of the shaft 39 of the vane wheel, this shaft being in the extension of the countershaft 4b and of the axis of the wind-wheel. The planet-pinions carrier 37 runs loose on the shaft 39 of the vane-wheel. The large crown wheel 40 of this first differential gearing, furnished with a band brake 41 is fixed rigidly with the planet-pinion carrier 42 of a second set of differential gearing that is coaxial with the previous one, of which the sun-wheel 43 is keyed on the end of the shaft 44 of the generator 6b, this shaft being hollow and coaxial with the shaft 39 of the vane wheel that goes right through it; the large crown wheel 45 of this second differential gearing is furnished likewise with a band brake 46 and it may turn loose on the shaft 44 of the generator 6b.

The working and the behaviour of the system made up as disclosed in this embodiment are exactly the same as disclosed in the previous embodiments. It should be observed however that in this last embodiment provision is no longer made of brake clutch set on the shaft of the generator and that the two band brakes 41 and 46 are placed to advantage on the large crown wheels 40 and 45 of the two differential sets of gearings.

What I claim is:

1. An apparatus of the character described comprising a windwheel, a shaft operatively connected with said windwheel and rotated thereby, an electric generator connected to the network, a shaft connected with said generator, two identical vane wheels of little diameter adapted to have their torque adjusted when running, means for adjusting said torque, shafts connected respectively with said vane wheels, said shafts having opposite directions and same axis at right angle to the axis of said windwheel, a shaft connected with said two vane wheels shafts, transmission means for connecting said shaft, said windwheel shaft and said generator shaft whereby enabling said three shafts to take variable angular velocities different to each other.

2. An apparatus of the character described comprising a windwheel, a shaft operatively connected with said windwheel and rotated thereby, a synchronous alternator connected to the network, a shaft connected with said alternator, two identical vane wheels of little diameter adapted to have their pitch adjusted when running, means for adjusting said pitch whereby keeping constant said vane wheels torque, shafts connected respectively with said vane wheels, said shafts having opposite directions and same axis at right angle to the axis of said windwheel, a shaft connected with said two vane wheels shafts, transmission means for connecting said shaft, said windwheel shaft and said generator shaft whereby enabling said three shafts to take variable angular velocities different to each other.

3. An apparatus of the character described comprising a windwheel, a shaft operatively connected with said windwheel and rotated thereby, an electric generator connected to the network, a shaft connected with said generator, two identical vane wheels of little diameter adapted to have their torque adjusted when running, means for adjusting said torque, shafts connected respectively with said vane wheels, said shafts having opposite directions and same axis at right angle to the axis of said windwheel, a shaft connected with said two vane wheels shafts, a differential gearing, including a sun-wheel rigidly fixed with said vane wheels driving shaft, planet-wheels, a planet-wheels carrier rigidly fixed with said windwheel shaft, and a large crown wheel rigidly fixed with said generator shaft, whereby enabling said three shafts to take variable angular velocities different to each other.

4. An apparatus as in claim 3, wherein said windwheel shaft is coaxial with said generator shaft.

5. An apparatus of the character described comprising a windwheel, a shaft operatively connected with said windwheel and rotated thereby, an electric generator connected to the network, a shaft connected with said generator, a vane wheel adapted to have its torque adjusted when running, means for adjusting said torque, a shaft connected with said vane wheel and parallel to said windwheel shaft, transmission means for connecting said vane wheel shaft, said windwheel shaft and said generator shaft whereby enabling said three shafts to take variable angular velocities different to each other.

6. An apparatus of the character described comprising a windwheel, a shaft operatively connected with said windwheel and rotated thereby, a synchronous alternator connected to the network, a shaft connected with said alternator, a vane wheel adapted to have its pitch adjusted when running, means for adjusting said pitch whereby enabling to keep constant said vane wheel torque, a shaft connected with said vane wheel and parallel to said windwheel shaft, transmission means for connecting said vane wheel shaft, said windwheel shaft and said generator shaft whereby enabling said three shafts to take variable angular velocities different to each other.

7. An apparatus of the character described comprising a windwheel, a shaft operatively connected with said windwheel and rotated thereby, an electric generator connected to the network, a shaft connected with said generator, a vane wheel adapted to have its torque adjusted when running, means for adjusting said torque, a shaft connected with said vane wheel and parallel to said windwheel shaft, a differential gearing including a sun-wheel rigidly fixed with said generator shaft, planet-wheels, a planet-wheels carrier rigidly fixed with said windwheel shaft, and a double-toothed crown wheel, a spur pinion rigidly fixed with said vane wheel shaft, a gearing connecting said crown wheel with said spur pinion whereby enabling said three shafts to take variable angular velocities different to each other.

8. An apparatus of the character described comprising a windwheel, a shaft operatively connected with said windwheel and rotated thereby, and electric generator connected to the network, a shaft connected with said generator, a vane wheel having its axis located in the extension of the axis of said windwheel, said vane wheel being adapted to have its torque adjusted when running, means for adjusting said torque, a shaft coaxial with said vane wheel and connected with said wheel, transmission means for connecting said vane wheel shaft, said windwheel shaft and said generator shaft whereby enabling said three shafts to take variable angular velocities different to each other.

9. An apparatus of the character described comprising a windwheel, a shaft operatively connected with said windwheel and rotated thereby, an electric generator connected to the network, a shaft connected with said generator, a vane wheel having its axis located in the extension of the axis of said windwheel, said vane wheel being adapted to have its torque adjusted when running, means for adjusting said torque, a shaft coaxial with said vane wheel and connected with said wheel, a differential gearing including a sun-wheel rigidly fixed with said vane wheel shaft, planet-wheels, a planet-wheels carrier rigidly fixed with said windwheel shaft, and a crown wheel, a second differential gearing coaxial with said previous differential gearing and including a sun-wheel rigidly fixed with said generator shaft, planet-wheels, a planet-wheels carrier rigidly fixed with the crown wheel of said previous differential gearing and a crown wheel rotatably mounted on said generator shaft, whereby enabling said crown wheel to turn loose on said generator shaft, and enabling said three shafts to take variable angular velocities different to each other.

10. An apparatus as in claim 9, wherein said vane wheel shaft and said generator shaft are coaxially mounted.

11. An apparatus as in claim 10, further comprising braking means adapted to act on said crown wheels rims so as to jam said wheels whenever desired whereby enabling to declutch and stop said windwheel.

12. An apparatus of the character described comprising a prime mover, making use of a fluid source of energy of great variability, compelled on this account equally to run at varying power, a shaft connected with said prime mover and rotated thereby, a main driven machine, a shaft connected with said machine, an auxiliary driven machine adapted to convey power received from said prime mover to said fluid source and adapted to have its torque adjusted when running, a shaft connected with said auxiliary driven machine, means for connecting said three shafts in differential speed relation to one another, means for adjusting the torque of said auxiliary driven machine, whereby providing an automatic control of the torque on said main driven machine shaft without acting on said prime mover and without converting energy into heat inside said apparatus.

13. An apparatus of the character described comprising a windwheel, a shaft connected with said windwheel and rotated thereby, a main driven machine, a shaft connected with said machine, an auxiliary driven machine adapted to convey power received from said windwheel to the air actuating said windwheel, and adapted to have its torque adjusted when running, a shaft connected with said auxiliary driven machine, means for connecting said three shafts in differential speed relation to one another, means for adjusting the torque of said auxiliary driven machine, whereby providing an automatic control of the torque on said main driven machine shaft without acting on said windwheel and without converting energy into heat inside said apparatus.

LUCIEN ROMANI.

References Cited in the file of this patent

UNITED STATES PATENTS

| Number | Name | Date |
|---|---|---|
| 554,138 | Negbaur et al. | Feb. 4, 1896 |
| 996,334 | Haskins | June 27, 1911 |
| 1,142,538 | Snee et al. | June 8, 1915 |
| 1,423,514 | Butusov | July 25, 1922 |
| 1,703,064 | Griffiths | Feb. 19, 1929 |
| 1,778,793 | Constantin | Oct. 21, 1930 |
| 2,024,531 | Lyons | Dec. 17, 1935 |
| 2,080,955 | Watkins | May 18, 1937 |
| 2,358,781 | Albers | Sept. 26, 1944 |

FOREIGN PATENTS

| Number | Country | Date |
|---|---|---|
| 27,895 | Australia | July 18, 1930 |